J. P. HINES.
CORN PLANTER.

No. 41,120. Patented Jan. 5, 1864.

Witnesses
J W Coombs
G W Reed

Inventor
J P Hines
per Munn & Co
Attys

UNITED STATES PATENT OFFICE.

J. P. HINES, OF INDEPENDENCE, IOWA, ASSIGNOR TO HIMSELF, G. H. ROBINSON, AND JOHN DUNSTER, OF SAME PLACE.

IMPROVEMENT IN CORN-PLANTERS.

Specification forming part of Letters Patent No. 41,120, dated January 5, 1864.

*To all whom it may concern:*

Be it known that I, J. P. HINES, of Independence, in the county of Buchanan and State of Iowa, have invented a new and Improved Corn-Planter; and I do hereby declare that the following is a full, clear, and exact description of the same, reference being had to the accompanying drawings, making a part of this specification, in which—

Figure 1:
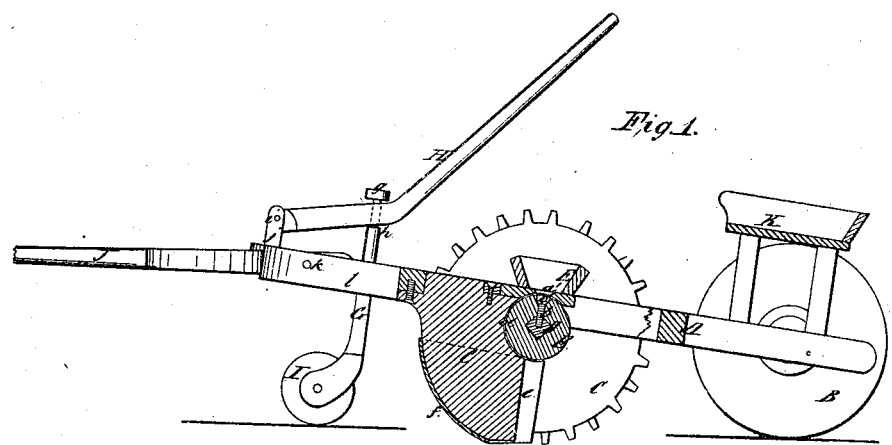
Figure 2:
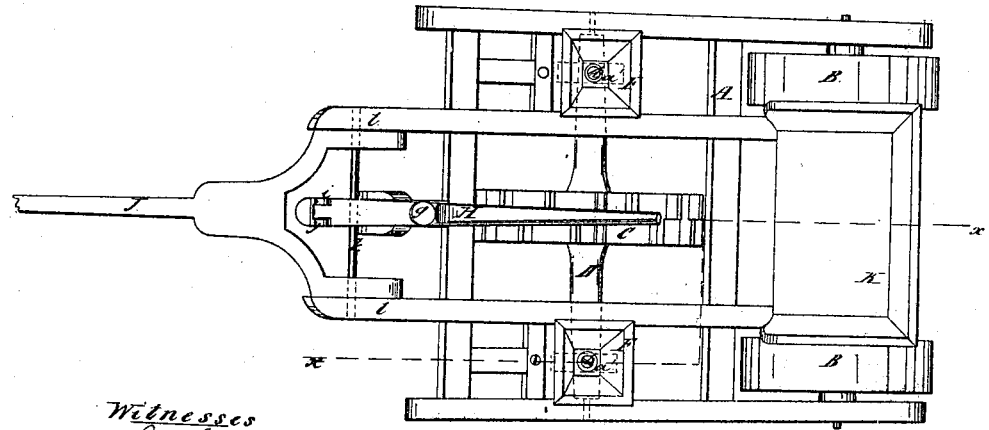

Figure 1 is a side sectional view of my invention, taken in the line $x\,x$, Fig. 2; Fig. 2, a plan or top view of the same.

Similar letters of reference indicate corresponding parts in the two figures.

To enable those skilled in the art to fully understand and construct my invention, I will proceed to describe it.

A represents a framing of rectangular form, the back part of which is supported by two wheels, B B; and C is a wheel which has a toothed periphery and is placed centrally on a shaft, D, at the front part of the framing, the wheel C being in a line with the center of the space between the wheels B B, as shown in Fig. 2.

On the shaft D there are placed two circular wheels, E E, which are placed underneath two hoppers, F F, on the framing A. The wheels E have each one or more holes, $a$, made in their peripheries, into which screws $b$ are fitted, the heads of the screws fitting in the holes $a$, as shown in Fig. 1. By screwing in and out the screws $b$ the capacity of the holes $a$ may be varied as desired. The bottoms of the hoppers F F are each perforated with a hole, $a'$, through which seed passes into the holes $a$ of the wheels E E. The wheels E E have their front parts working in semicircular recesses $d$ in the back parts of standards C C, which are attached to the framing A. (See Fig. 1.) These standards C C are sheathed with metal, and they each have a vertical recess or groove, $e$, at their back parts, through which the seed is discharged into the furrows made by the standard C, for the latter are rounded at their front parts, as shown at $f$, to form furrow openers or shares, as shown in Fig. 1.

In the front part of the framing A, directly in front of the wheel C, there is fitted an upright spindle, G, the upper part of which passes through a lever, H, the spindle having a head, $g$, on its upper end above the lever, and a shoulder, $h$, upon it below the lever H, as shown in Fig. 1. The front end of the lever H is connected by a joint, $i$, to a short upright, $j$, on the framing A.

To the lower end of the spindle G there is attached a wheel, I. The spindle G is allowed to turn freely in the framing, and the wheel I is consequently a caster-wheel.

J is the draft-pole, which is attached to the framing A, the former being fitted on a rod, $k$, which passes through longitudinals bars $l\,l$ on the framing A.

From the above description it will be seen that as the implement is drawn along the wheel C will be rotated by traction, the teeth of the wheel puncturing the ground and insuring its rotation. The shaft D and wheels E E of course are rotated by the wheel C, and the seed discharged from the wheels E by the holes $a$. The wheels B B serve as coverers and rollers, and compact the earth firmly upon the seed. The driver's seat K is on the back part of the framing, and the driver, from his seat, may operate the lever H—that is to say, press it down when necessary—and thereby elevate the front part of the framing A, so as to raise the wheel C above the surface of the ground and render the machine inoperative, as is necessary in turning at the ends of rows, or in drawing the machine from place to place.

Having thus described my invention, what I claim as new, and desire to secure by Letters Patent, is—

The arrangement and combination of the wheels C E E, hoppers F, and sheathed standards C with the spindle G, lever H, and seat K, in the manner herein shown and described.

J. P. HINES.

Witnesses:
C. ABORN,
S. S. ALLEN.